United States Patent [19]

Harriott et al.

[11] Patent Number: 5,021,187

[45] Date of Patent: Jun. 4, 1991

[54] COPPER DIAMINE COMPLEXES AND THEIR USE AS BLEACH ACTIVATING CATALYSTS

[75] Inventors: Sharon M. Harriott, Rutherford, N.J.; Van Au, Peekskill, N.Y.; Wayne M. Rees, Cincinnati, Ohio

[73] Assignee: Lever Brothers Company, Division of Conopco, Inc., New York, N.Y.

[21] Appl. No.: 333,527

[22] Filed: Apr. 4, 1989

[51] Int. Cl.[5] ........................... C09K 3/00; C07F 1/08

[52] U.S. Cl. .......................... 252/186.38; 252/186.42; 252/99; 252/186.39; 556/110

[58] Field of Search ...................... 252/186.38, 186.39, 252/186.41, 99; 556/110, 116

[56] References Cited

U.S. PATENT DOCUMENTS

| | | | |
|---|---|---|---|
| 2,686,798 | 6/1952 | Gmittek | 556/110 |
| 2,924,552 | 2/1960 | Harwood et al. | 556/110 |
| 3,156,654 | 11/1964 | Konecny et al. | 252/99 |
| 3,630,921 | 12/1971 | Disch et al. | 252/186.38 |
| 4,547,305 | 10/1989 | Cornelissen et al. | 252/186.38 |
| 4,595,773 | 6/1986 | White | 556/110 |
| 4,626,373 | 12/1986 | Finch et al. | 252/186.38 |
| 4,728,455 | 3/1988 | Rerek | 252/186.38 |
| 4,810,410 | 3/1989 | Diakun et al. | 252/186.38 |

FOREIGN PATENT DOCUMENTS

| | | | |
|---|---|---|---|
| 0531809 | 4/1975 | U.S.S.R. | 556/110 |

OTHER PUBLICATIONS

Thompson, "J. Am. Chem. Soc.", 106, 8309 (1984).

Thompson, "Biological and Inorganic Copper Chemistry", vol. 2, Karlin and Zubieta, Editors, Adenine Press (1986).

Basolo and Murmann, "J. Am. Chem. Soc.", 74, 5243 (1952) and 76 211 (1954).

R. N. Icke, B. B. Wisegarver & G. A. Alles, "Organic Synthesis", vol. 3, p. 725, Wiley & Sons (1955).

J. R. Wasson, T. P. Mitchell & W. H. Bernard, "J. Inorg. Nucl. Chem. Lett.", 30, 2865 (1968).

Meek and Ehrhardt, "J. Inorg. Chem.", vol. 4, pp. 584–587 (1965).

*Primary Examiner*—John S. Maples
*Assistant Examiner*—Joseph D. Anthony
*Attorney, Agent, or Firm*—Milton L. Honig

[57] ABSTRACT

Bleach activators are herein disclosed having the stoichiometric formula:

$$[Cu(R_1R_2CHR_5(CH_2)_nR_6CHNR_3R_4)X_m] \quad (I)$$

wherein $R_1$, $R_2$, $R_3$, $R_4$, $R_5$ and $R_6$ are each a radical selected from the group consisting of hydrogen, alkyl, aryl, alkylaryl, arylalkyl, phenyl, benzyl and mixtures thereof, or $R_5$ and $R_6$ together form a hydrogen carbon ring, n is an integer from 0 to 1, m is an integer from 1 to 2, and X is selected from mono- and polyvalent anions.

These bleach activators are combined with a peroxygen compound capable of releasing hydrogen perioxide in an aqueous solution. The combination is especially effective in the removal of hydrophobic stains from fabrics.

17 Claims, No Drawings

COPPER DIAMINE COMPLEXES AND THEIR USE AS BLEACH ACTIVATING CATALYSTS

BACKGROUND OF THE INVENTION

1. Field of the Invention

The invention relates to novel bleach activators, bleaching compositions containing these activators, and a method for bleaching laundry fabrics.

2. The Prior Art

Active oxygen-releasing compounds are well known as effective bleaching agents. These compounds are frequently incorporated into detergent compositions for stain and soil removal. Unlike the traditional sodium hypochlorite, hydrogen peroxide-releasing compounds are less aggressive and thus more compatible with the ingredients of detergent compositions. On the other hand, the bleaching activity of these compounds is highly temperature dependent. Use of hydrogen peroxide releasing bleaches is only practical where the wash temperatures are above 60° C. Below this temperature, extremely high amounts of the active oxygen-releasing compound must be added to achieve the desired result. Frequently, wash temperatures are, however, on the low side for various reasons including that of energy efficiency.

The temperature problem can be solved by use of transition metal containing compounds which catalyze or activate the oxygen-releasing material. Typical metals known in the art include those of iron, cobalt, manganese and copper. Only select transition metal substances provide the efficient catalysis necessary for laundry fabrics application. Furthermore, not all types of stains are removable by the transition metal-hydrogen peroxide generated substances. Especially difficult to bleach are hydrophobic stains such as those caused by spaghetti sauce and the like.

As one approach to an improved bleach activator, attention has been focused upon the chemistry of copper (II) polyamine complexes. Certain of these complexes have been reported as binding peroxide. For instance, see Thompson, J. Am. Chem. Soc. 106, 8309 (1984) and Thompson, Biological and Inorganic Copper Chemistry, Vol. 2, Karlin and Zubieta, Editors, Adenine Press (1986). Tetraethylethylenediamine ligands have been shown by Thompson to stabilize the formation of $\mu$-peroxodicopper (II) complexes using dioxygen and Cu(I) compounds. Basolo and Murmann, J. Am. Chem. Soc. 74, 5243 (1952) and 76 211 (1954) report the chelating tendencies and hydrolytic stability of copper (II) dibromide complexes of various ethylene diamine ligands. Among those ligands are N,N'-dimethyl, -diethyl, -dipropyl, and -dibutyl analogs. None of the aforementioned references suggest, however, that these copper complexes can be employed to promote hydrogen peroxide activation using active oxygen-releasing compounds such as sodium perborate in the laundering of fabrics.

Accordingly, it is an object of the present invention to provide novel bleach activators that together with active oxygen-releasing compounds are capable of yielding peroxides over a wide temperature range including that of under 60° C.

Another object of the present invention is to provide novel bleach activators that are highly efficient in removing hydrophobic stains.

A further object of the present invention is to provide a bleaching composition that is highly effective at cleaning soiled fabrics.

SUMMARY OF THE INVENTION

A bleaching composition is herewith provided comprising the following components:

(i) from about 1 to 60% of a peroxygen compound capable of releasing hydrogen peroxide in an aqueous solution; and (ii) from about 0.01 to about 3% of a bleach activator having the stoichiometric formula:

$$[Cu(R_1R_2NCHR_5(CH_2)_nR_6CHNR_3R_4)X_m] \quad (I)$$

wherein $R_1$, $R_2$, $R_3$, $R_4$, $R_5$ and $R_6$ are each a radical selected from the group consisting of hydrogen, alkyl, aryl, alkylaryl, arylalkyl, phenyl, benzyl and mixtures thereof, or $R_5$ and $R_6$ together form a hydrocarbon ring, n is an integer from 0 to 1, m is an integer from 1 to 2, and X is selected from mono- and polyvalent anions.

Furthermore, the invention is also directed at a method of bleaching laundry fabrics that involves contacting fabrics with an aqueous solution of the peroxygen compound and the copper complex.

DETAILED DESCRIPTION OF THE INVENTION

A series of copper (II)-diamine complexes have been found to perform as activators promoting the release of hydrogen peroxide from peroxygen compounds. These complexes are characterized by the stoichiometric formula:

$$[Cu(R_1R_2NCHR_5(CH_2)_nR_6CHNR_3R_4)X_m] \quad (I)$$

wherein $R_1$, $R_2$, $R_3$, $R_4$, $R_5$ and $R_6$ are each a radical selected from the group consisting of hydrogen, alkyl, aryl, alkylaryl, arylalkyl, phenyl, benzyl and mixtures thereof, or $R_5$ and $R_6$ together form a hydrocarbon ring, n is an integer from 0 to 1, m is an integer from 1 to 2, and X is selected from mono- and polyvalent anions.

The complexes represented by formula I may be in the monomeric, dimeric (bridged) or polymeric forms all of which are considered to fall within the general empirical formula.

Most preferred among these activators are the copper (II) complexes of N,N',N,N'-dibenzyldimethylethylenediamine (DBDMED), N,N',N,N'-di(phenylethyl)dimethylethylenediamine (DPEDMED), N,N',N,N'-di(phenylethyl)dimethylcyclohexanediamine (DPEDMCD), and of N,N', N,N'- di(dimethylbutyl)dimethylethylenediamine (DDMBDMED). Other complexes which were investigated but found to have less efficacy were copper (II) complexes of N,N',N,N'-tetramethylethylenediamine (TMED), N,N',N,N'-di-n-butyldimethylethylenediamine (DB'DMED), N,N'-di-n-butylethylenediamine (DB'ED), N,N'-dibenzylethylenediamine (DBED), N,N',N,N'-dibenzyldi-n-butylethylenediamine (DBDB'ED), N,N'-di(phenylethyl)ethylenediamine (DPEED), N,N'-di(phenylethyl)propanediamine (DPEPD), and of N,N',N,N'-di(dimethylbutyl)dimethylpropanediamine (DDMBDMPD). All of these complexes will incorporate X ligands which are mono- or polyvalent anions that render the complex water soluble under wash conditions (pH higher than 8). Typical X anions include chloride, bromide, nitrate, sulfate, hydroxide, acetate, tetrafluoroborate, phosphate, and similar anions.

The foregoing catalysts may be incorporated into detergent bleach compositions which require as an essential component a peroxygen bleaching compound capable of releasing hydrogen peroxide in an aqueous solution.

Hydrogen peroxide sources are well known in the art. They include the alkali metal peroxides, organic peroxide bleaching compounds such as urea peroxide, and inorganic persalt bleaching compounds, such as the alkali metal perborates, percabonates, perphosphates and persulfates. Mixtures of two or more such compounds may also be suitable. Particularly preferred are sodium perborate tetrahydrate and, especially, sodium perborate monohydrate. Sodium perborate monohydrate is preferred because it has excellent storage stability while also dissolving very quickly in aqueous bleaching solutions.

Typically, the ratio of peroxygen compound, on a hydrogen peroxide weight release basis, to that of the copper complex will range from about 100:1 to 1:1, preferably from about 50:1 to 10:1, optimally between about 20:1 to 10:1.

A detergent formulation containing a bleach system consisting of an active oxygen releasing material and a novel activator compound of the invention will usually also contain surface-active materials, detergency builders and other known ingredients of such formulations.

The surface-active materials may be naturally derived, such as soap, or a synthetic material selected from anionic, nonionic, amphoteric, zwitterionic, cationic actives and mixtures thereof. Many suitable actives are commercially available and are fully described in the literature, for example in "Surface Active Agents and Detergents", Volumes I and II, by Schwartz, Perry and Berch. The total level of the surface-active material may range up to 50% by weight, preferably being from about 1% to 40% by weight of the composition, most preferably 4 to 25%.

Synthetic anionic surface-actives are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulphates, especially those obtained by sulphating higher ($C_8$–$C_{18}$) alcohols produced for example from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol-alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $Cl_2$ and then hydrolyzing with a base to produce a random sulphonate; sodium and ammonium $C_7$–$C_{12}$ dialkyl sulfosuccinates; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulphonates, sodium ($C_6$–$C_{18}$) alkyl sulphates and sodium ($C_{16}$–$C_{18}$) alkyl ether sulphates.

Examples of suitable nonionic surface-active compounds which may be used, preferably together with the anionic surface-active compounds, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 6–30 EO, and products made by condensation of ethylene oxide with the reaction products of propylene oxide and ethylene diamine. Other so-called nonionic surface-actives include alkyl polyglycosides, long chain tertiary amine oxides, long chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

Soaps may also be incorporated into the compositions of the invention, preferably at a level of less than 30% by weight. They are particularly useful at low levels in binary (soap/anionic) or ternary mixtures together with nonionic or mixed synthetic anionic and nonionic compounds. Soaps which are used are preferably the sodium, or less desirably potassium, salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 15%, are used to give a beneficial effect on detergency. This is particularly valuable in compositions used in hard water where the soap acts as a supplementary builder.

The detergent compositions of the invention will normally also contain a detergency builder. Builder materials may be selected from (1) calcium sequestrant materials, (2) precipitating materials, (3) calcium ion-exchange materials and (4) mixtures thereof.

Examples of calcium sequestrant builder materials include alkali metal polyphosphates, such as sodium tripolyphosphate; nitrilotriacetic acid and its water-soluble salts; the alkali metal salts of carboxymethyloxy succinic acid, ethylene diamine tetraacetic acid, oxydisuccinic acid, mellitic acid, benzene polycarboxylic acids, citric acid; and polyacetalcarboxylates as disclosed in U.S. Pat. Nos. 4,144,225 and 4,146,495.

Examples of precipitating builder materials include sodium orthophosphate, sodium carbonate and long-chained fatty acid soaps.

Examples of calcium ion-exchange builder materials include the various types of water-insoluble crystalline or amorphous aluminosilicates, of which zeolites are the best known representatives.

These builder materials may be present at a level of, for example, from 5 to 80% by weight, preferably from 10 to 60% by weight.

When the peroxygen compound and bleach activator are dispersed in water, hydrogen peroxide is generated which should deliver from about 0.1 to about 50 ppm active oxygen per liter of water; preferably oxygen delivery should range from 2 to 30 ppm. Copper complex measured as cupric ion concentration should be present in the wash water in an amount from about 0.1 to 5 ppm, preferably around about 1.5 ppm. Surfactant should be present in the wash water from about 0.05 to 1.0 grams per liter, preferably from 0.15 to 0.20 grams per liter. When present, the builder amount will range from about 0.1 to 3.0 grams per liter.

Apart from the components already mentioned, the detergent compositions of the invention can contain any of the conventional additives in the amounts in which such materials are normally employed in detergent compositions. Examples of these additives include lather boosters such as alkanolamides, particularly the monoethanolamides derived from palmkernel fatty acids and coconut fatty acids; lather depressants such as alkyl phosphates and silicates; anti-redeposition agents such as sodium carboxymethylcellulose and alkyl or substituted alkylcellulose ethers; other stabilizers such as ethylene diamine tetraacetic acid; fabric softening agents; inorganic salts such as sodium sulphate; and usually present in very small amounts, fluorescent whitening agents, perfumes, enzymes such as proteases, cellulases, lipases and amylases, germicides and colorants.

The bleach compositions and activators described herein are useful in a variety of cleaning products. These include laundry detergents, laundry bleaches, hard surface cleaners, toilet bowl cleaners, automatic dishwashing compositions and even denture cleaners. Activators of the present invention can be introduced in a variety of product forms including powders, on sheets or other substrates, in pouches, in tablets or in non-aqueous liquids such as liquid nonionic detergents.

The following examples will more fully illustrate the embodiments of this invention. All parts, percentages and proportions referred to herein in the appended claims are by weight unless otherwise illustrated.

EXAMPLE 1

Preparation of the Ligands

Tetramethylethylenediamine (TMED) and N,N'-dibenzylethylenediamine (DBED) were both obtained from the Aldrich Chemical Company. N,N'-di-n-butylethylenediamine (DB'ED) was obtained from Alpha Products, Inc. Other ligands were prepared as outlined below. Proton NMR spectra of the prepared diamines were obtained on either Varian T-60 or IBM/-Bruker AC200 spectrometers. Shift values are referenced relative to TMS (0.0 ppm).

N,N',N,N'-Dibenzyldimethylethylenediamine (DBDMED)

A modification of the Eischweiler-Clarke N-methylation procedure was employed as described in R. N. Icke, B.B. Wisegarver and G.A. Alles, *Organic Synthesis V.* 3 p. 725, Wiley and Sons (1955). To 5.12 g of 90% formic acid, chilled to ice-water temperature in a 250 ml round bottom flask, 4.71 ml of N,N'-dibenzylethylenediamine was added slowly with stirring.

Water was added (25 ml) to dissolve the resulting salt. To the clear solution, 4.50 ml of 37% formaldehyde solution was added and the contents refluxed until slight gas evolution occurred. The solution was then air-cooled for 20 minutes, then refluxed overnight.

After the solution was cooled to room temperature, 40 ml of 1 M HCl was added and the resulting solution rotary evaporated to dryness. This solid was dissolved in a minimum of water and a solution containing 3.60 g of NaOH in 50 ml water was added to form the free base. The aqueous solution was extracted with 3×30 ml toluene, the extract dried using $MgSO_4$, and the toluene removed via rotovap. Traces of toluene in the resulting oil were removed by adding petroleum ether and distilling off the solvent on a steam bath. $1_H$ NMR ($CDCl_3$)=7.2 (s), 3.5 (s) 2.5 (s), 2.1 (s). Integration was consistent with the assigned structure.

N,N',N,N'-Di-n-butyldimethylethylenediamine (DB'DMED)

A procedure analogous to that used for the synthesis of DBDMED was employed. A viscous oil was obtained. $1_H$ NMR ($CDCl_3$)=4.2 (s), 4.0 (s), 2.8–2.0 (m, broad), 1.8–1.2 (m, broad). Integration was consistent with the assigned structure.

N,N',N,N'-Dibenzyldi-n-butylethylenediamine (DBDB'ED)

A solution of 9.04 g DBED, 65 ml methanol, and 6.40 g $NaHCO_3$ was prepared in a 125 ml round bottom flask. To this solution 11.00 g of n-butylbromide was added dropwise with stirring. The flask was fitted with a reflux condenser and drying tube, then slowly warmed to reflux and maintained at that temperature for three days. Methanol solvent was stripped from the reaction mixture by rotovap and 30 ml water added to the oily mixture. After adjusting the pH to 10.5 using 1 M NaOH, the free base was extracted with 2×40 ml petroleum ether. Upon drying the ether extract, filtering and evaporating the solvent, a clear viscous liquid remained. Yield was 10.93 g; $1_H$ NMR (neat)=7.0 (s), 3.3 (s), 2.4 (s), 2.2 (m, broad), 1.2 (m, broad), 0.6 (m, broad). Integration was consistent with the suggested structure.

N,N',N,N'-Di(phenylethyl)dimethylethylenediamine (DPEDMED)

1)Ethylenediamine (4.6 g) was dissolved in 50 ml of tetrahydrofuran (THF) in a round bottomed flask. Phenylacetyl chloride (5.9 g) in 10 ml of THF was added dropwise at room temperature. After the addition, the reaction mixture was allowed to stir for 30 minutes and was filtered to collect the white solid precipitate. The white solid was washed with 5% aqueous HCl and then with dilute $NaHCO_3$ solution and dried in the oven.

The white solid prepared above (3 g) and sodium borohydride (7.7 g) were added to 30 ml of dioxane, with cooling in an ice bath. Glacial acetic acid (12.2 g) in 20 ml of dioxane was added slowly dropwise. The mixture was slowly heated to 85° C. for three hours, was cooled and evaporated to dryness. Dilute aqueous $H_2SO_4$(50 ml) was added followed by a small amount of aqueous NaOH to bring the pH to about 11. The aqueous solution was extracted with three portions of chloroform. The chloroform extract was dried with $MgSO_4$, filtered and rotary evaporated to dryness. A yellow oily residue remained and was shown by NMR to be di(-phenylethyl)ethylenediamine.

2) Formic acid (3.4 g of 90%) was chilled to 0° C. in an ice bath and 4.0 g of the diphenylethylethylenediamine was added slowly with stirring. Formaldehyde (3.4 g of 37%) was added followed by 10 ml of water. The mixture was refluxed for four hours. After the solution cooled to room temperature, 50 ml of 1M HCl was added and the solution was rotary evaporated to dryness. The white solid residue was dissolved in 50 ml of water containing 3.5 g of NaOH. The solution was extracted with three portions of toluene and the extract was dried with $MgSO_4$, filtered and rotary evaporated. A viscous oil was obtained, shown by NMR to be di(-phenylethyl)dimethylethylenediamine.

N,N'-Di(phenylethyl)ethylenediamine) (DPEED)

A procedure according to step 1 for the synthesis of DPEDMED was used. A viscous oil was obtained.

N,N',N,N'-Di(phenylethyl)dimethylcyclohexanediamine (DPEDMCD)

A procedure analogous to that used for the synthesis of DPEDMED was employed, substituting trans-1,2-diaminocyclohexane for ethylenediamine. A viscous oil was obtained.

N,N',N,N'-Di(dimethylbutyl)dimethylethylenediamine (DDMBDMED)

A procedure analogous to that used for the synthesis of DPEDMED was employed, substituting tert-butylacetyl chloride for phenylacetyl chloride. A viscous oil was obtained.

N,N'-Di(dimethylbutyl)propanediamine (DDMBPD)

A procedure analogous to step 1 of the synthesis of DPEDMED was used, substituting tert-butylacetyl chloride and propanediamine for phenylacetyl chloride and ethylenediamine. A viscous oil was obtained.

N,N'-Di(phenylethyl)propanediamine (DPEPD)

A procedure analogous to that used for the synthesis of DPEDMED was employed, substituting propanediamine for ethylenediamine. A viscous oil was obtained.

EXAMPLE 2

Preparation of the Copper (II) Dichloride Comolexes $CuCl_2$ (ethylenediamine) complexes were prepared by modifications of procedures outlined in J.R. Wasson, T.P. Mitchell and W.H. Bernard, J. Inorg. Nucl. Chem. Lett. 30, 2865 (1968) and references therein. The complexes so isolated were analyzed for cupric ion content by flame atomic absorbance on a Varian 1275 AA and found to be satisfactory.

$CuCl_2$ (TMED): Copper (II) Dichloro(N,N,N',N'-Tetramethylethylenediamine)

A solution of 1.56 g of TMED in 15 ml methanol was added slowly dropwise to a rapidly stirring solution of 2.00 g anhydrous $CuCl_2$ dissolved in 120 ml of warm isopropanol. Upon final addition, the warm solution was slowly cooled to room temperature with stirring. Deep blue microcrystals precipitated from the solution which were collected by suction filtration and washed with several small portions of isopropanol followed by ethyl ether. Yield upon drying in a vacuum oven at 70° C. for several hours was 3.28 g.

$CuCl_2$ (DBED): Copper (II) Dichloro(N,N'-Dibenzylethylenediamine)

A solution of 1.61g of DBED in 20 ml acetone was added slowly dropwise to a rapidly stirring solution of 1.00 g anhydrous $CuCl_2$ in 100 ml of acetone. A light blue powder immediately precipitated and was collected by suction filtration, washed with several small portions of isopropanol, then diethyl ether and dried in vacuo for several hours at 70° C. Yield was 2.34 g.

$CuCl_2$ (DB'ED): Copper (II) Dichloro(N,N'-Di-n-butylethylenediamine)

A solution of 2.00 g DB'ED in 20 ml isopropanol was added slowly dropwise to a rapidly stirring solution of 2.05 g $CuCl_2 \cdot 2H_2O$ in 60 ml isopropanol. A green precipitate resulted which was collected by suction filtration, washed with cold isopropanol, then diethyl ether. The yield of medium green solid was 2.80 g upon drying overnight in vacuo at 60° C.

$CuCl_2$ (DBDMED): Copper (II) Dichloro(N,N',N,N'-Dibenzyldimethylethylenediamine)

A solution of 0.70 g DBDMED in 15 ml absolute ethanol was added dropwise to a rapidly stirring solution of 0.37 g anhydrous $CuCl_2$ in 65 ml absolute ethanol. A blue-green microcrystalline solid resulted which was collected by suction filtration and washed with 2×5 ml ethanol followed by 2×5 ml diethyl ether. The resulting crystalline solid was dried overnight in vacuo.

$CuCl_2$ (DB'DMED): Copper (II) Dichloro(N,N'N,N'-Di-n-butyldimethylethylene diamine)

A solution of 1.76 g of DB'DMED in 10 ml of warm isopropanol was added dropwise to a rapidly stirring solution of 1.50 g $CuCl_2 \cdot 2H_2O$ in 60 ml warm isopropanol. A blue solution formed together with a small amount of brown solid. The solution was filtered warm, cooled to 5° C., and 75 ml diethyl ether added to the cooled filtrate dropwise with stirring. Deep blue-green crystals resulted upon continued chilling of the solution. These crystals were collected by suction filtration, washed with 2×10 ml 3/1 diethylether/isopropanol, and then washed with 2×10 ml diethyl ether. The solid crystalline product was dried in vacuo overnight at room temperature. Yield was 1.12 g.

$CuCl_2$ (DBDB'ED): Copper (II) Dichloro(N,N',N,N'-Dibenzyldi-n-butyl-ethylenediamine)

A solution of 3.00 g of DBDB'ED in 10 ml acetone was rapidly added to a vigorously stirred solution of 1.16 g $CuCl_2 \cdot 2H_2O$ in 50 ml acetone. An initial blue solution resulted from which deep blue-green microcrystals precipitated. The crystalline solid was collected by suction filtration and washed with 3×10 ml diethyl ether. The yield upon drying in vacuo at 70° C. for several hours was 2.57 g.

$CuCl_2$ (DPEDMED): Copper (II) Dichloro(N,N',N,N'-Di(phenylethyl)dimethylethylenediamine)

A solution of 1.98 g of DPEDMED in 10 ml of dry ethanol was added slowly to a solution containing 0.9 g of anhydrous cupric chloride in 50 ml of dry ethanol with rapid stirring. A green crystalline precipitate separated. The solution was allowed to stir for an additional 10 minutes followed by vacuum filtration to collect the solids. The crystalline solids were washed with a small portion of ethanol, then washed with diethyl ether and dried in a vacuum oven at 40° C. Yield was 2.44 g (85%).

$CuCl_2$ (DDMBDMED): Copper (II) Dichloro(N,N',N,N'-Di(dimethylbutyl)dimethylethylenediamine)

A solution of 1.3 g of DDMBDMED in 5 ml of dry ethanol was slowly added to a solution containing 0.7 g of anhydrous cupric chloride in 20 ml dry ethanol with rapid stirring. A blue-purple crystalline precipitate separated. The solution was allowed to stir for an additional 5 minutes followed by vacuum filtration to collect the solids. The crystalline solids were then washed with a small portion of diethyl ether and dried in a vacuum oven at 40° C.

$CuCl_2$ (DPEED): Copper (II) Dichloro(N,N'-Di(phenylethyl)ethylenediamine)

A solution of 1.79 g of DPEED in 10 ml of dry ethanol was slowly added to a solution containing 0.9 g of anhydrous cupric chloride in 50 ml dry ethanol with rapid stirring. A blue precipitate separated. The solution was allowed to stir for an additional 10 minutes, followed by vacuum filtration to collect the solids which were then washed with a small portion of diethyl ether. Product was then vacuum dried in an oven at 40° C.

$CuCl_2$ (DPEPD): Copper (II) Dichloro(N,N'-Di(Phenylethyl)propanediamine)

A solution of 2.1 g of DPEPD in 5 ml of dry ethanol was slowly added to a solution containing 1.0 g anhydrous cupric chloride in 40 ml dry ethanol with rapid stirring. A blue-pink solid separated. The solution was allowed to stir for an additional 10 minutes after which solids were collected by vacuum filtration. The solids were washed with a small portion of diethyl ether and dried in a vacuum oven at 40° C. Obtained were 2.4 g amounting to an 85% yield.

$CuCl_2$ (DDMBPD): Copper (II) Dichloro(N,N'-Di(dimethylbutyl)propanediamine)

A solution of 2.38 g of DDMBPD in 10 ml of dry ethanol was slowly added to a solution containing 1.4 g of anhydrous cupric chloride in 40 ml dry ethanol with rapid stirring. After the addition was completed, the solution was allowed to stir for an additional 10 minutes followed by vacuum filtration to collect the blue precipitate. The precipitate was then washed with a small portion of diethyl ether and dried in a vacuum oven at 40° C.

$CuCl_2$ (DPEDMCD): Copper (II) Dichloro(N,N',N,N'-Di(phenylethyl)dimethylcyclohexanediamine)

A solution of 0.34 g of anhydrous cupric chloride in 20 ml of isopropanol was slowly added to a solution containing 1.0 g of DPEDMCD in 20 ml isopropanol with rapid stirring. A green crystalline precipitate separated. The solution was allowed to stir for an additional 10 minutes followed by vacuum filtration to collect the precipitate. Solids were then washed with a small portion of diethyl ether and dried in a vacuum oven at 40° C. Obtained were 1.24 g of a product representing a 92.5% yield.

EXAMPLE 3

The bleach activating ability of the copper complexes was demonstrated on Ragu® stained cloths.

Bleaching Terg-O-Tometer experiments were done at 40° C. using the recommended dose of detergent powder (P-Surf® at 1.50 g/l or concentrated "all"® at 2.31 g/l) in deionized, distilled water, for a 15 minute wash, 2 stain cloths per one liter pot. P-Surf® experiments were carried out at 120 ppm standard hardness; no hardness was used in the concentrated "all"® experiments. Activator concentration was 1.50 ppm cupric ion (as complex) unless otherwise specified, oxidant (perborate) levels were either 60, 30 or 15 ppm active oxygen as described in the individual experiments. Bleaching results are reported as changes in reflectance (B) units (LAB scale) as a function of the number of consecutive washes, 1 or 2.

Stain bleaching was measured reflectometrically using a Colorgard/System/05 Reflectometer. Bleaching was measured as "Δ" where the quantity ΔB is the change in the b-axis of the Hunter color scale. The spaghetti stain is initially orange-red and loses color with bleaching and thus bleaching produces a negative change in B. Since peroxide-only controls were also carried out with the spaghetti sauce stains, copper complex bleaching was actually reported as "−ΔΔB" which provides a positive value, and the higher the number the better the performance. This value is calculated as: $-\Delta\Delta B = \Delta B\text{ (wash)} - \Delta B\text{ (blank)}$.

Bleach catalysis experiments were also conducted with copper (II) sulfate as controls. For example, under conditions of 3 ppm copper (II), 40° C., pH 9.5, 60 ppm active oxygen, P-Surf® detergent and no added hardness, washing Ragu® stain cloths gave a −ΔΔB value of 1 unit. This value was significantly smaller than the values obtained by washing with any of the copper-diamine catalysts. All values reported in the following tables were calculated using blank values from uncatalyzed washes under identical conditions.

TABLE I

Conditions: 40° C., pH 10.0, P-Surf®, Ragu® 120 ppm hardness, 1.5 ppm $Cu^{+2}$, 60 ppm oxygen

| Catalyst | Wash 0 | Wash 1 | Wash 2 | −ΔΔB |
|---|---|---|---|---|
| blank | 31.97 | 25.13 | 21.62 | |
| $CuCl_2$ (TMED) | 31.48 | 22.83 | 17.75 | 3.4 |
| $CuCl_2$ (DBED) | 30.95 | 21.93 | 15.98 | 4.6 |
| $CuCl_2$ (DBDMED) | 31.55 | 17.13 | 4.55 | 16.7 |

TABLE II

Conditions: 40° C., pH 10.0, Con-"all"®, Ragu® 0 ppm hardness, 1.5 ppm $Cu^{+2}$, 60 ppm oxygen

| Catalyst | Wash 0 | Wash 1 | Wash 2 | −ΔΔB |
|---|---|---|---|---|
| blank | 31.60 | 25.18 | 21.10 | |
| $CuCl_2$ (TMED) | 32.58 | 24.80 | 15.63 | 6.5 |
| $CuCl_2$ (DBED) | 32.03 | 21.08 | 10.55 | 11.0 |
| $CuCl_2$ (DBDMED) | 31.10 | 22.58 | 4.33 | 16.3 |

TABLE III

Conditions: 40° C., pH 10.0, P-Surf®, Ragu® 120 ppm hardness, 1.5 ppm $Cu^{+2}$, 60 ppm oxygen

| Catalyst | Wash 0 | Wash 1 | Wash 2 | −ΔΔB |
|---|---|---|---|---|
| blank | 30.18 | 23.40 | 19.88 | |
| $CuCl_2$ (DBED) | 30.95 | 21.93 | 15.98 | 4.6 |
| $CuCl_2$ (DBDMED) | 30.65 | 18.75 | 6.25 | 14.1 |
| $CuCl_2$ (DB'ED) | 30.80 | 22.10 | 16.33 | 4.2 |

TABLE III-continued

| Conditions: 40° C., pH 10.0, P-Surf ®, Ragu ® 120 ppm hardness, 1.5 ppm $Cu^{+2}$, 60 ppm oxygen | | | | |
|---|---|---|---|---|
| Catalyst | Wash 0 | Wash 1 | Wash 2 | −ΔΔB |
| $CuCl_2$ (DB'DMED) | 31.10 | 20.83 | 9.53 | 11.3 |

TABLE IV

| Conditions: 40° C., pH 10.0, P-Surf ®, Ragu ® 120 ppm hardness, 1.5 ppm $Cu^{+2}$, 60 ppm oxygen | | | | |
|---|---|---|---|---|
| Catalyst | Wash 0 | Wash 1 | Wash 2 | −ΔΔB |
| blank | 31.00 | 24.08 | 20.43 | |
| $CuCl_2$ (DBED) | 30.95 | 21.93 | 15.98 | 4.6 |
| $CuCl_2$ (DBDMED) | 31.55 | 17.93 | 4.55 | 16.7 |
| $CuCl_2$ (DBDB'ED) | 31.85 | 24.95 | 19.35 | 2.0 |

TABLE V

| Conditions: 40° C., pH 10.0, P-Surf ®, Ragu ® 120 ppm hardness, 1.5 ppm $Cu^{+2}$ as $CuCl_2$ (DBDMED) | | | | |
|---|---|---|---|---|
| Active Oxyqen Level | Wash 0 | Wash 1 | Wash 2 | −ΔΔB |
| blank | 32.18 | 24.16 | 18.94 | |
| 60 ppm | 31.55 | 17.13 | 4.55 | 16.7 |
| 30 ppm | 30.75 | 17.08 | 4.40 | 13.1 |
| 15 ppm | 30.68 | 19.40 | 7.10 | 10.3 |

TABLE VI

| Conditions: 40° C., pH 10.0, Con-"all " ®, Ragu ® 0 ppm hardness, 1.5 ppm $Cu^{+2}$ as $CuCl_2$ (DBDMED) | | | | |
|---|---|---|---|---|
| Active Oxygen Level | Wash 0 | Wash 1 | Wash 2 | −ΔΔB |
| blank | 32.54 | 25.89 | 21.21 | |
| 60 ppm | 31.10 | 22.58 | 4.33 | 16.3 |
| 30 ppm | 32.48 | 19.98 | 4.68 | 16.5 |
| 15 ppm | 32.45 | 22.53 | 8.80 | 12.4 |

TABLE VII

| Conditions: 40° C., pH 10.0, P-Surf ®, Ragu ® 120 ppm hardness, 1.5 ppm $Cu^{+2}$, 60 ppm oxygen | | | | |
|---|---|---|---|---|
| Catalyst | Wash 0 | Wash 1 | Wash 2 | −ΔΔB |
| blank | 31.65 | 25.08 | 21.58 | |
| $CuCl_2$ (DBDMED) | 30.75 | 20.58 | 8.25 | 12.4 |
| $CuCl_2$ (DBDMED) + 10 equiv. ligand (DBDMED) | 31.68 | 19.95 | 4.43 | 17.2 |

TABLE VIII

| Conditions: 40° C., pH 10.0, P-Surf ®, Ragu ® 120 ppm hardness, 60 ppm oxyqen | | | | |
|---|---|---|---|---|
| $CuCl_2$ (DBDMED) Level | Wash 0 | Wash 1 | Wash 2 | −ΔΔB |
| blank | 31.05 | 24.53 | 20.84 | |
| 0.5 ppm $Cu^{+2}$ | 31.35 | 22.75 | 16.88 | 4.3 |
| 1.0 ppm $Cu^{+2}$ | 31.70 | 22.60 | 12.70 | 8.8 |
| 1.5 ppm $Cu^{+2}$ | 30.40 | 19.60 | 7.23 | 13.0 |
| 4.0 ppm $Cu^{+2}$ | 31.10 | 15.90 | 3.08 | 17.8 |

TABLE IX

| Conditions: 40° C., pH 9.50, 15 min. single wash Con-"all" ®, 0 ppm hardness, 1.5 ppm $Cu^{+2}$, 60 ppm oxygen | |
|---|---|
| Catalyst | −ΔΔB |
| $CuCl_2$ (DBDMED) | 5.33 |
| $CuCl_2$ (DPEED) | 1.93 |
| $CuCl_2$ (DPEDMED) | 5.88 |
| $CuCl_2$ (DDMBDMED) | 9.10 |
| $CuCl_2$ (DPEDMCD) | 9.10 |
| $CuCl_2$ (DPEPD) | 3.50 |

TABLE IX-continued

| Conditions: 40° C., pH 9.50, 15 min. single wash Con-"all" ®, 0 ppm hardness, 1.5 ppm $Cu^{+2}$, 60 ppm oxygen | |
|---|---|
| Catalyst | −ΔΔB |
| $CuCl_2$ (DDMBPD) | 3.30 |

TABLE X

| Conditions: 40° C., pH 9.50, 15 min. single wash, Con-"all" ®, 0 ppm hardness, 1.5 ppm $Cu^{+2}$ | | |
|---|---|---|
| Catalyst | Active Oxygen (ppm) | −ΔΔB |
| $CuCl_2$ (DPEDMCD) | 60 | 9.1 |
| | 30 | 9.6 |
| | 15 | 8.9 |
| $CuCl_2$ (DDMBDMED) | 60 | 9.1 |
| | 30 | 10.1 |
| | 15 | 10.9 |

TABLE XI

| Conditions: 40° C., pH 9.50, 15 min. single wash, Con-"all" ®, 1.5 ppm $Cu^{+2}$, 60 ppm oxygen | | |
|---|---|---|
| Catalyst | Hardness (ppm) | −ΔΔB |
| $CuCl_2$ (DDMBDMED) | 0 | 13.6 |
| | 60 | 9.6 |
| | 120 | 10.1 |
| | 240 | 10.5 |

TABLE XII

| Conditions: 40° C., pH 9.50, 15 min. single wash, Con-"all" ®, 1.5 ppm $Cu^{+2}$, 60 ppm oxygen | | |
|---|---|---|
| Catalyst | Cupric Ion (ppm) | −ΔΔB |
| $CuCl_2$ (DPEDMCD) | 1.5 | 7.60 |
| | 2.0 | 11.00 |
| | 2.5 | 14.30 |
| $CuCl_2$ (DDMBDMED) | 1.5 | 9.35 |
| | 2.0 | 12.40 |
| | 2.5 | 14.30 |

TABLE XIII

| Conditions: pH 9.50, 15 min. single wash, Con-"all" ® 0 ppm hardness, 1.5 ppm $Cu^{+2}$, 60 ppm oxygen | | |
|---|---|---|
| Catalyst | Temperature (°C.) | −ΔΔB |
| $CuCl_2$ (DPEDMCD) | 20 | 3.8 |
| | 30 | 8.7 |
| | 40 | 11.4 |
| $CuCl_2$ (DDMBDMED) | 20 | 3.6 |
| | 30 | 7.4 |
| | 40 | 10.5 |

TABLE XIV

| Conditions: 40° C., 15 min. single wash, Con-"all" ® 0 ppm hardness, 1.5 ppm $Cu^{+2}$, 60 ppm oxygen | | |
|---|---|---|
| Catalyst | pH | −ΔΔB |
| $CuCl_2$ (DPEDMCD) | 9.5 | 14.00 |
| | 10.0 | 8.15 |
| | 10.5 | 7.55 |

Based upon the bleaching experiments, the ordering of catalyst activity with respect to ligand structure was: DDMBDMED=DPEDMCD<DPEDMED=DBDMED<DB'DMED<DBED=DB'ED<TMED DBDB'ED and DBDMED<DPEPD=DDMBPD<DPEED. The differences in catalyst activity were quite large and consistent in ranking in both P-Surf ® and concentrated "all" ® detergents. Near total cleaning of the stain was achieved in two consecutive washes with $CuCl_2$ (DBDMED), $CuCl_2$ (DPEDMED), $CuCl_2$ (DPEDMCD) and $CuCl_2$ (DDMBDMED) as catalysts.

The bleaching profile vs. oxidant concentration changes little over a wide range of peroxide concentrations (15–60 ppm active oxygen). Higher levels of oxidant, 60 ppm, did not enhance bleaching relative to 30 ppm. Bleaching at 15 ppm was only slightly depressed.

The influence of added ligand on the catalytic activity of $CuCl_2$ (DBDMED) was also examined. A ten-fold excess of DBDMED in the wash liquor gave only a modest 4 B unit increase in bleaching in two washes over the complex alone. Space filling models and literature formation constants indicate only monoethylenediamine copper (II) complexes are considerably stable when a di-tertiarydiamine is used. This, together with our observations of negligible free ligand dependence on bleaching activity, suggests an active species in a ratio of 1 diamine to 1 cupric ion. Thus, even in the absence of excess ligand the catalyst remains essentially intact prior to taking part in stain bleaching.

It has also been observed that methylation of the secondary diamine ligands significantly enhanced catalyst activity in the cases of DBED, DB'ED and DPEED.

Steric effects appear to be quite important in catalyst activity where the ligand has considerable hydrophobic character. Marked increases in catalyst performance were obtained from N-methylation of N,N'-dibenzylethylenediamine, N,N'-di-n-butylethylenediamine or N,N'-di(phenylethyl)ethylenediamine ligands, a rather small change in hydrophobic character but large with respect to steric bulk. The most active complexes studied were those of copper (II) dichloride N,N',N,N'-di(-phenylethyl)dimethylcyclohexanediamine ($CuCl_2$ DPEDMCD) and copper (II) dichloride N,N',N,N'-di(-dimethylbutyl)dimethylethylenediamine ($CuCl_2$ DDMBDMED).

The foregoing description and examples illustrate selected embodiments of the present invention. In light thereof, various modifications will be suggested to one skilled in the art, all of which are within the spirit and purview of this invention.

What is claimed is:

1. A bleaching composition comprising:

( i) from about 1 to 60% of a peroxygen compound capable of yielding hydrogen peroxide in an aqueous solution; and (ii) from about 0.01 to about 3% of a bleach activator having the stoichiometric formula:

$$[Cu(R_1R_2NCHR_5(CH_2)_nR_6CHNR_3R_4)X_m] \quad (I)$$

wherein $R_1$, $R_2$, $R_3$, $R_4$, $R_5$ and $R_6$ are each a radical selected from the group consisting of hydrogen, alkyl, aryl, alkylaryl, arylalkyl, phenyl, benzyl and mixtures thereof, or $R_5$ and $R_6$ together form a hydrogen carbon ring, n is an integer from 0 to 1, m is an integer from 1 to 2, and X is selected from mono- and polyvalent anions.

2. A composition according to claim i wherein the bleach activator is a copper (II) (N,N'N,N'-dibenzyldimethylethylenediamine) complex.

3. A composition according to claim 1 wherein the bleach activator is a copper (II) (N,N'N,N'-dibenzyldi-n-butylethylenediamine) complex.

4. A composition according to claim 1 wherein the bleach activator is a copper (II) (N,N',N,N'-di-n-butyldimethylethylenediamine) complex.

5. A composition according to claim 1 wherein the bleach activator is a copper (II) (tetramethylethylenediamine) complex.

6. A composition according to claim 1 wherein the bleach activator is a copper (II) (N,N'-dibenzylethylenediamine) complex.

7. A composition according to claim 1 wherein the bleach activator is a copper (II) (N,N'-di-n-butylethylenediamine) complex.

8. A composition according to claim 1 wherein the bleach activator is a copper (II) (N,N'-di-(phenylethyl-)ethylenediamine) complex.

9. A composition according to claim 1 wherein the bleach activator is a copper (II) (N,N',N,N'-di(phenylethyl)dimethylethylenediamine) complex.

10. A composition according to claim 1 wherein the bleach activator is a copper (II) (N,N',N,N'-di(dimethylbutyl)dimethylethylenediamine) complex.

11. A composition according to claim 1 wherein the bleach activator is a copper (II) (N,N'-di(phenylethyl)-propanediamine) complex.

12. A composition according to claim 1 wherein the bleach activator is a copper (II) (N,N'-di(dimethylbutyl)propanediamine) complex.

13. A composition according to claim 1 wherein the bleach activator is a copper (II) (N,N',N,N'-di(phenylethyl)dimethylcyclohexanediamine) complex.

14. A composition according to claim 1 wherein the peroxygen compound is selected from the group consisting of sodium perborate tetrahydrate, sodium perborate monohydrate and mixtures thereof.

15. A composition according to claim 1 further comprising from 1 to 40% of a surfactant and from 5 to 80% of a detergent builder.

16. A method for bleaching fabrics comprising suspending said fabrics in an aqueous wash solution along with a peroxygen compound capable of yielding hydrogen peroxide and a bleach activator having the empirical formula:

$$[Cu(R_1R_2NCHR_5(CH_2)_nR_6CHNR_3R_4)X_m] \quad (I)$$

wherein $R_1$, $R_2$, $R_3$, $R_4$, $R_5$ and $R_6$ are each a radical selected from the group consisting of hydrogen, alkyl, aryl, alkylaryl, arylalkyl, phenyl, benzyl and mixtures thereof, or $R_5$ and $R_6$ together form a hydrogen carbon ring, n is an integer from 0 to 1, m is an integer from 1 to 2, and X is selected from mono- and polyvalent anions.

17. A method according to claim 16 wherein the peroxygen compound is present in an amount from about 0.1 to about 50 ppm and the bleach activator in an amount from 0.1 to 5.0 ppm on a cupric ion basis.

* * * * *